(12) United States Patent
Lohr

(10) Patent No.: US 8,181,226 B2
(45) Date of Patent: May 15, 2012

(54) METHOD AND APPARATUS FOR MULTIMEDIA SESSION TRANSFER

(75) Inventor: Jonathan C. Lohr, Raleigh, NC (US)

(73) Assignee: Sony Mobile Communications AB, Lund (SE)

( * ) Notice: Subject to any disclaimer, the term of this patent is extended or adjusted under 35 U.S.C. 154(b) by 973 days.

(21) Appl. No.: 11/163,655

(22) Filed: Oct. 26, 2005

(65) Prior Publication Data

US 2007/0094490 A1 Apr. 26, 2007

(51) Int. Cl.
 *H04L 29/06* (2006.01)
(52) U.S. Cl. ............... 726/3; 726/2; 709/225; 709/227; 709/228; 709/224; 709/223; 455/436; 455/412.2; 455/456.1; 455/456.2; 455/519
(58) Field of Classification Search ................ None
See application file for complete search history.

(56) References Cited

U.S. PATENT DOCUMENTS

| | | | | |
|---|---|---|---|---|
| 1 A * | 7/1836 | Ruggles | ............... | 295/4 |
| 6,788,949 B1 * | 9/2004 | Bansal | ............... | 455/519 |
| 6,990,513 B2 * | 1/2006 | Belfiore et al. | ............... | 709/203 |
| 7,099,946 B2 * | 8/2006 | Lennon et al. | ............... | 709/227 |
| 7,191,233 B2 * | 3/2007 | Miller | ............... | 709/227 |
| 7,296,295 B2 * | 11/2007 | Kellerman et al. | ............... | 726/26 |
| 7,317,924 B2 * | 1/2008 | Virtanen et al. | ............... | 455/456.1 |
| 7,356,567 B2 * | 4/2008 | Odell et al. | ............... | 709/206 |
| 7,356,771 B2 * | 4/2008 | Paul et al. | ............... | 715/744 |
| 7,363,344 B1 * | 4/2008 | Coletrane et al. | ............... | 709/206 |
| 7,369,868 B2 * | 5/2008 | Dunko et al. | ............... | 455/517 |
| 7,433,956 B2 * | 10/2008 | Zhao et al. | ............... | 709/228 |
| 7,447,513 B2 * | 11/2008 | Anttila et al. | ............... | 455/519 |
| 7,487,248 B2 * | 2/2009 | Moran et al. | ............... | 709/227 |
| 7,694,034 B1 * | 4/2010 | Breau et al. | ............... | 710/16 |
| 7,734,793 B2 * | 6/2010 | Bowman-Amuah | ............... | 709/228 |
| 7,739,392 B2 * | 6/2010 | Wu | ............... | 709/227 |
| 7,773,550 B2 * | 8/2010 | Lin | ............... | 370/313 |
| 7,792,976 B2 * | 9/2010 | Zhao et al. | ............... | 709/228 |
| 7,809,842 B2 * | 10/2010 | Moran et al. | ............... | 709/227 |

(Continued)

FOREIGN PATENT DOCUMENTS

FR 2834159 6/2003

(Continued)

OTHER PUBLICATIONS

PCT International Search Report, PCT/US2006/020889, corresponding PCT Application dated Oct. 9, 2006.

(Continued)

*Primary Examiner* — Syed A. Zia
(74) *Attorney, Agent, or Firm* — Patrick B. Horne; Moore & Van Allen, PLLC

(57) ABSTRACT

The invention consists of a first communications device on which an active session is taking place and a second communications device that is not involved in the active session. When a transfer of the session from the first communications device to the second communications device is desired, the handoff is triggered either automatically or manually. The first communications device sends a transfer initiation message to the second communications device. An acknowledgement message is sent from the second communications device to the first communications device. The second communications device, upon receipt of the address information, sends a server transfer message to the session server. The session server, in response to the server transfer message, routes new content to the identified second communications device.

14 Claims, 4 Drawing Sheets

U.S. PATENT DOCUMENTS

| | | | | |
|---|---|---|---|---|
| 7,908,475 | B2* | 3/2011 | Smith et al. | 713/162 |
| 7,953,803 | B2* | 5/2011 | Hayes, Jr. | 709/206 |
| 8,060,590 | B2* | 11/2011 | Lobbert | 709/223 |
| 8,078,719 | B2* | 12/2011 | Etelapera | 709/224 |
| 2002/0062345 | A1* | 5/2002 | Guedalia et al. | 709/204 |
| 2002/0090934 | A1* | 7/2002 | Mitchelmore | 455/412 |
| 2003/0009577 | A1* | 1/2003 | Apostolopoulos et al. | 709/231 |
| 2003/0055977 | A1* | 3/2003 | Miller | 709/227 |
| 2003/0088765 | A1* | 5/2003 | Eschbach et al. | 713/150 |
| 2003/0101343 | A1* | 5/2003 | Eaton et al. | 713/170 |
| 2003/0137947 | A1* | 7/2003 | Roy et al. | 370/310 |
| 2003/0139179 | A1* | 7/2003 | Fuchs et al. | 455/426 |
| 2003/0142648 | A1* | 7/2003 | Semper | 370/331 |
| 2003/0154398 | A1* | 8/2003 | Eaton et al. | 713/201 |
| 2003/0191818 | A1* | 10/2003 | Rankin et al. | 709/219 |
| 2003/0195963 | A1* | 10/2003 | Song et al. | 709/227 |
| 2003/0236848 | A1* | 12/2003 | Neiman et al. | 709/213 |
| 2004/0068567 | A1* | 4/2004 | Moran et al. | 709/227 |
| 2004/0203944 | A1* | 10/2004 | Huomo et al. | 455/466 |
| 2004/0219918 | A1* | 11/2004 | Kakishima et al. | 455/436 |
| 2004/0236848 | A1* | 11/2004 | Roy et al. | 709/223 |
| 2005/0033843 | A1* | 2/2005 | Shahi et al. | 709/226 |
| 2005/0188095 | A1* | 8/2005 | Gardiner et al. | 709/230 |
| 2005/0220041 | A1* | 10/2005 | Lin | 370/278 |
| 2006/0120287 | A1* | 6/2006 | Foti et al. | 370/231 |
| 2006/0268781 | A1* | 11/2006 | Svensson et al. | 370/331 |
| 2006/0276192 | A1* | 12/2006 | Dutta et al. | 455/436 |
| 2007/0086425 | A1* | 4/2007 | Leow et al. | 370/350 |
| 2007/0276715 | A1* | 11/2007 | Beringer et al. | 705/7 |
| 2007/0291694 | A1* | 12/2007 | Zhang | 370/331 |
| 2009/0138606 | A1* | 5/2009 | Moran et al. | 709/227 |
| 2009/0196286 | A1* | 8/2009 | Long et al. | 370/352 |
| 2009/0298484 | A1* | 12/2009 | White | 455/414.3 |
| 2010/0208634 | A1* | 8/2010 | Eng et al. | 370/310 |
| 2010/0274916 | A1* | 10/2010 | Lin | 709/230 |
| 2011/0296030 | A1* | 12/2011 | Gaxiola | 709/227 |

FOREIGN PATENT DOCUMENTS

| | | |
|---|---|---|
| JP | 2003 304251 | 12/2003 |
| WO | 0143459 | 6/2001 |

OTHER PUBLICATIONS

PCT Written Opinion of the International Searching Authority, PCT/US2006/020889, corresponding PCT Application dated Oct. 9, 2006.

International Preliminary Report on Patentability, corresponding to International Patent Application No. PCT/US2006/020889, dated May 8, 2008.

* cited by examiner

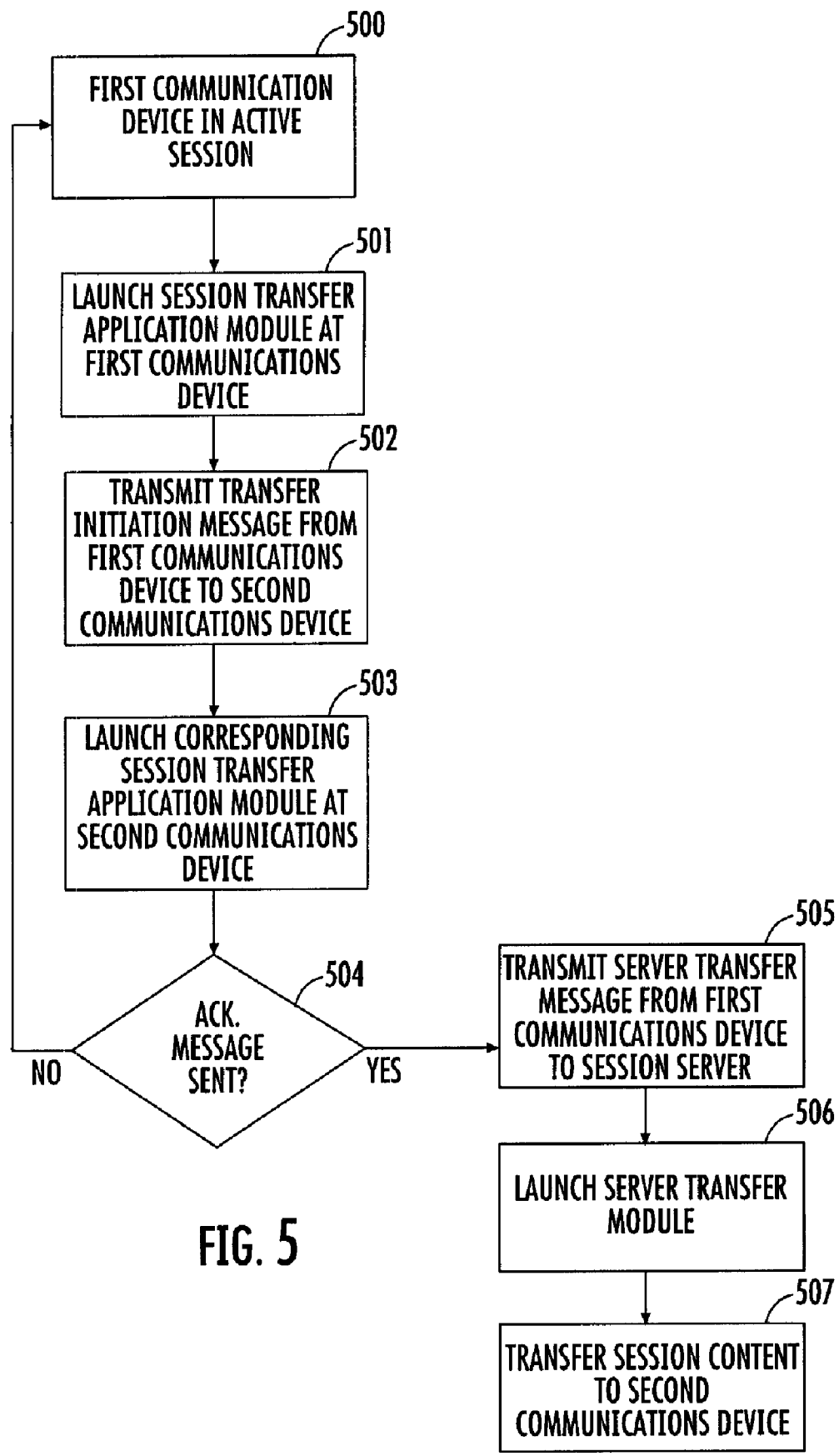

METHOD AND APPARATUS FOR MULTIMEDIA SESSION TRANSFER

BACKGROUND OF THE INVENTION

The invention relates generally to multimedia applications for wireless communication devices and more particularly to a method and apparatus for transferring a multimedia application to or from a wireless communication device to another communication device, either wired or wireless.

Wireless communication devices such as cellular phones, PCS phones, personal digital assistants, portable computers or the like provide mobility for communication applications such that a user can access multimedia applications virtually anywhere. Such devices are commonly used for multimedia applications such as streaming audio, streaming video, instant messaging, push-to-talk and other applications. Moreover, the robustness of mobile communication devices to handle such multimedia applications and the development of new applications means that the use of wireless communication devices for such applications will continue to increase.

Because of the mobile nature of wireless communication devices the situation may arise where a mobile user that is involved in a multimedia session on a first wireless communication device may want to continue the session but on a different communication device. For example, a wireless user that is receiving streaming video on a mobile phone may want to transfer the session to a desk top computer without terminating the session. Likewise, a user in an active session at a desk top computer may want to continue the session on a mobile device. The desire to transfer the session may result from a need to transfer the session for technical reasons such as battery life or screen size or simply a desire to continue the session in a different environment. Today the user must terminate the session on one communication device and reinitiate the session on the second communication device.

A method and apparatus for allowing a user to transfer an active multimedia session between a first communications device and a second communications device without terminating the session is desired.

SUMMARY OF THE INVENTION

The invention consists of a first communications device on which an active session is taking place and a second communications device that is not involved in the active session. While the second communications device is not involved in the active session it must be capable of handling the same type of session as the first communications device. For example, if the active session on the first communications device is streaming video, the second communications device must be able to receive, process and display the streaming video. When a transfer of the session from the first communications device to the second communications device is desired, the handoff is triggered either automatically or manually. To support the handoff the invention relies on a technology such as Bluetooth, IrDA, wireless LAN or a serial cable. The first communications device sends a transfer initiation message to the second communications device that may include, session ID information, authentication information, and session history. An acknowledgement message is sent from the second communications device to the first communications device and may include address information of the second communications device. The second communications device, upon receipt of the address information, sends a server transfer message containing the address information and session ID information to the session server using GPRS, EDGE, UMTS or the like. If the second communications device is not a mobile device, the transfer message may be sent via the internet without the use of mobile technology. The session server, in response to the server transfer message, routes new content to the identified second communications device.

BRIEF DESCRIPTION OF THE DRAWINGS

FIG. 5 is a flow chart illustrating the operation of the method of the invention.

DETAILED DESCRIPTION OF PREFERRED EMBODIMENTS OF THE INVENTION

The present invention will now be described in terms of specific example embodiments. It is to be understood that the invention is not limited to the example embodiments disclosed. It should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media is conceptually illustrated at 22 of FIG. 1 as a fixed storage media, but it could also be a removable optical or magnetic disc or tape. The computer program instructions can reside on any medium that can contain, store, communicate, propagate, or transport computer program code for execution by any type of computing platform, instruction execution system, or collection of such systems interconnected via a bus or network. Such a computer readable medium may be, for example, but not limited to, an electronic, magnetic, optical, electromagnetic, infrared, or semiconductor system, device, or propagation medium. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Computer program instructions which implement all or a portion of the invention may also be embodied in a stream of information being retrieved over a network such as the Internet.

The term "module" is meant to refer to a specific process that is performed as part of the system discussed throughout. Often a module corresponds to a software application.

Figure 1:
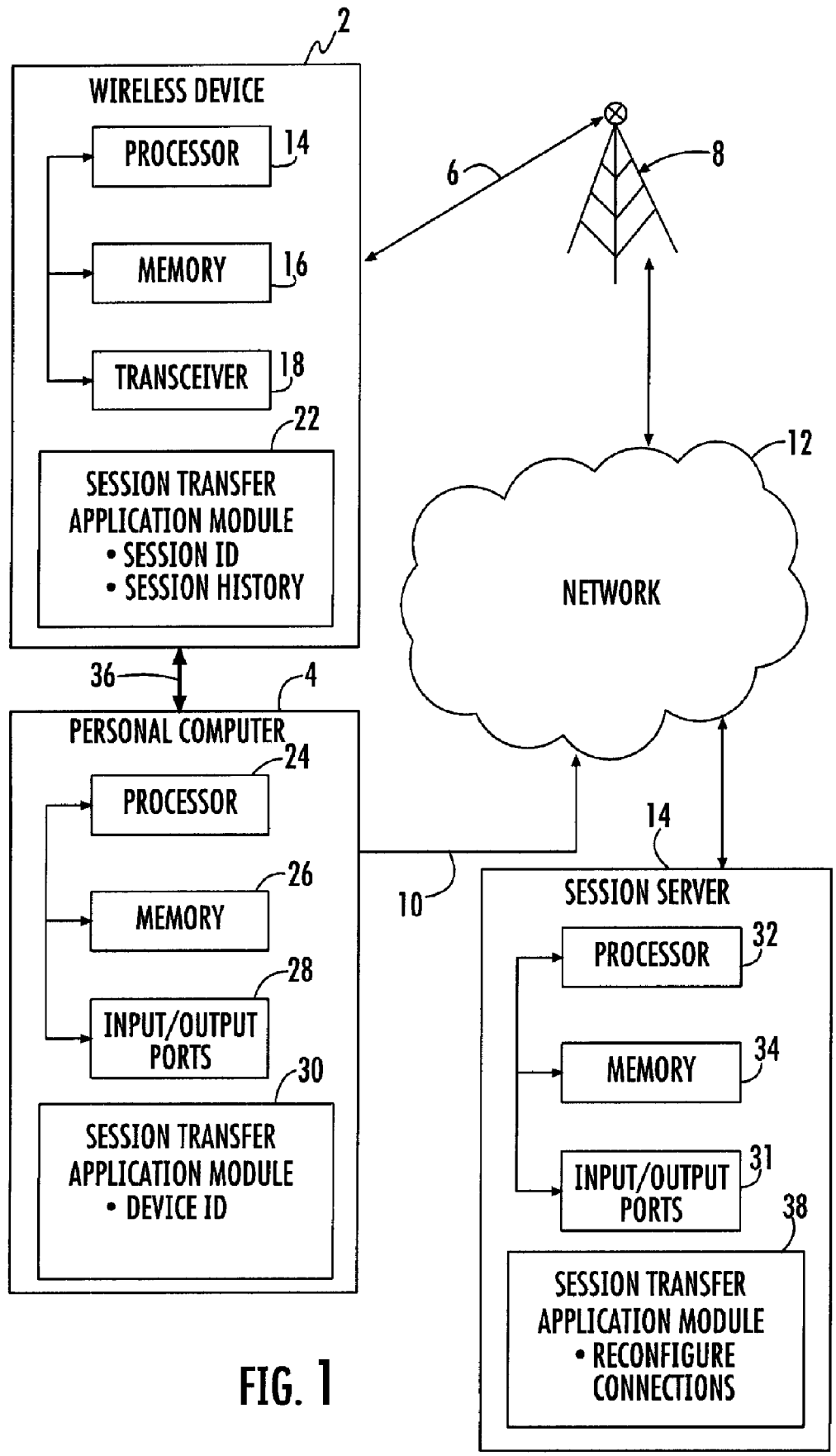
FIG. 1 is a block diagram of a network in which the method and apparatus of the invention is employed

Referring to FIG. 1 an example of a network in which the method and apparatus of the invention may be employed is shown consisting of a first communications device 2 such as a wireless terminal such as a cell phone and a second communications device 4 such as a personal computer. It is to be understood that while two example communications devices are illustrated any device capable of transmitting and receiving content over network 12 may be used. The wireless terminal 2 is connected to network 12 over an air interface 6 using GSM, CDMA, TDMA, GPRS, EDGE, UMTS or the like via base station 8 as is known. The personal computer 4 is connected to the network 12 over a wired connection 10 such as the public switched telephone network (PSTN), cable network or the like. While in the system shown in FIG. 1 the first communications device 2 is illustrated connected to the network over a wireless connection and the second communications device 4 is illustrated as connected to the network over a wired connection it is to be understood that both devices may be connected to the network over wireless connections. Network 12 may include the PSTN, the Internet, LANs, WANs, wireless networks including cellular and PCS and any other network facility used to communicate signals between communications devices.

Wireless device 2 may include a processor 14 for running the application modules of the invention as well as for controlling the functions of the device as is known in the art. Memory 16 is provided for storing the application modules used in the invention. A radio transceiver 18 is also provided for transmitting radio signals to and from network 12 as is known.

Personal computer 4 may include a processor 24 for running the application modules of the invention as well as for controlling the functions of the device as is known in the art. Memory 26 is provided for storing the application modules used in the invention. Input/output ports 28 are also provided for transmitting radio signals to and from network 12 as is known.

A session server 14 is also connected to the network 12 such that it can be accessed by both of the communications devices 2 and 4. The session server 14 may include, for example, an instant message server, audio or video conferencing server, a source of streaming audio or video or other server type. Session server 14 includes a computer 32 and a computer software session transfer application module 38 that carries out the server task including the examples set forth above. The server may be divided into file serving, allowing users to store and access files on a common computer; and application serving, where the software runs a computer program to carry out some task for the users.

Computer 32 may comprise a mainframe computer or minicomputer or microprocessor technology. The server 14 has high-capacity (and sometimes redundant) power supplies, a motherboard built for durability in continuous operations, large quantities of ECC RAM 34, and fast I/O subsystems 31 employing technologies such as SCSI, RAID, and PCI-X or PCI Express.

The first communications device 2 and the second communications device 4 can also communicate directly with one another over link 36. Link 36 may comprise Bluetooth technology, IrDA or a wireless LAN. It will be appreciated that all of these communications technologies are capable of providing wireless communication between the communications devices. Bluetooth and IrDA are particularly well suited for brief wireless exchanges of data. In addition to these wireless technologies wired technologies can be used to provide interconnectivity between the communications devices such as a serial cable. While a serial cable is the most secure and reliable technology, it requires an additional piece of hardware that is not required for the wireless technologies discussed above.

Figure 2:
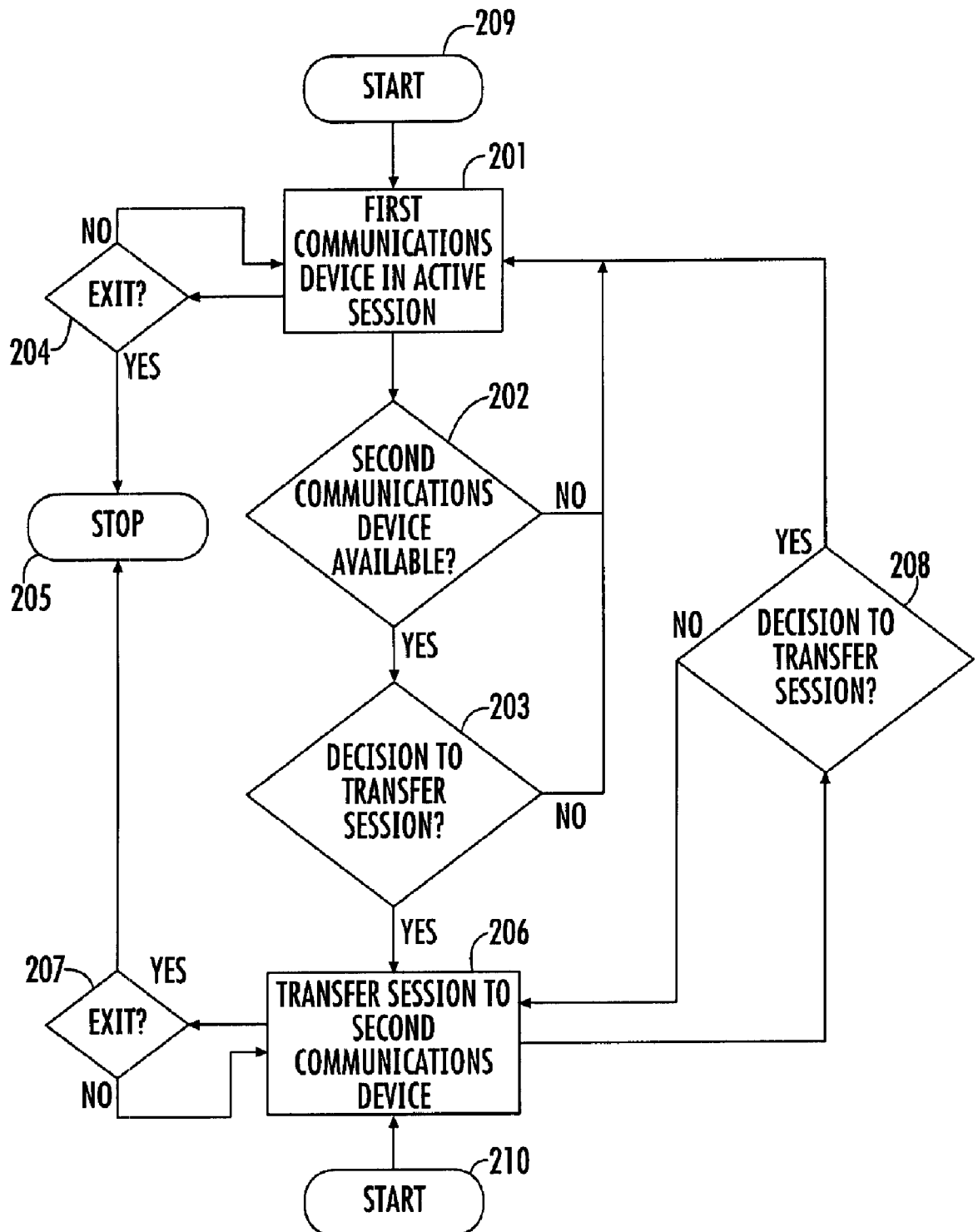
FIG. 2 is a flow chart illustrating the operation of the method of the invention.

Referring to FIG. 2 the transfer of an application from a first communications device to a second communications device is shown where a first communications device is active in a multimedia session (block 201). If no acceptable second device is available the session continues on the first communications device (block 202). Once a suitable second device becomes available the user can either opt to transfer the session based on direct user input or a predefined configuration or the session can remain active on the first communications device (block 203). The user can maintain the session on the first communications device until terminated as is known in the art (block 204). When the user decides to terminate the session the session is stopped (block 205). If the user decides to transfer the session based on direct user input or a predefined configuration, the session is transferred to the second communications device as will hereinafter be described (block 206). When the user decides to exit the session (bock 207) the session is stopped (block 205). Moreover the user may decide to again transfer the session to another new communications device (block 208). The new communications device may be the first communications device that originally had the active session or a third communications device. It should be noted the transfer process may be initiated from either device as represented by blocks 209 and 210.

For explanation purposes assume that the first communications device 2 is a mobile wireless terminal that is currently engaged in an IM session. Further assume that the second terminal 4 is a PC connected to the network 12 via the Internet. The user of the wireless terminal desires to switch the session from the wireless terminal 2 to the PC 4. This can occur for example when the user on the wireless terminal initiates the session remote from the PC but wants to continue the session after nearing the PC. The wireless terminal 2 includes a session transfer application module 22 for initiating the transfer of the session. The session may be initiated automatically any time the mobile terminal nears a properly enabled second communications device or the session may be initiated manually.

Using Bluetooth technology for transmitting the messages between the communications devices allows the transfer to take place automatically whenever the first communications device gets in close proximity to an enabled second communications device. Bluetooth must be activated on both devices with a configuration that allows pairing to take place. As is known in the art, pairing creates a secure and automated connection between two devices with Bluetooth radios. After pairing, signals may be exchanged using a standard Bluetooth profile such as the Bluetooth Generic Object Exchange Profile. The protocol for the transfer message may be embedded in the data stream and acted upon by the Session Transfer Application Modules 22 and 30. In devices configured for manual transfer, the user makes a selection via the communications device user interface to search for a similarly enabled second communications device. When the second device is located, the user makes another command using the user interface of the first communications device to initiate transfer of the session from the first communications device to the second communications device. The exchange of information between the devices are sent using the Bluetooth Generic Object Exchange Profile.

Figure 3:
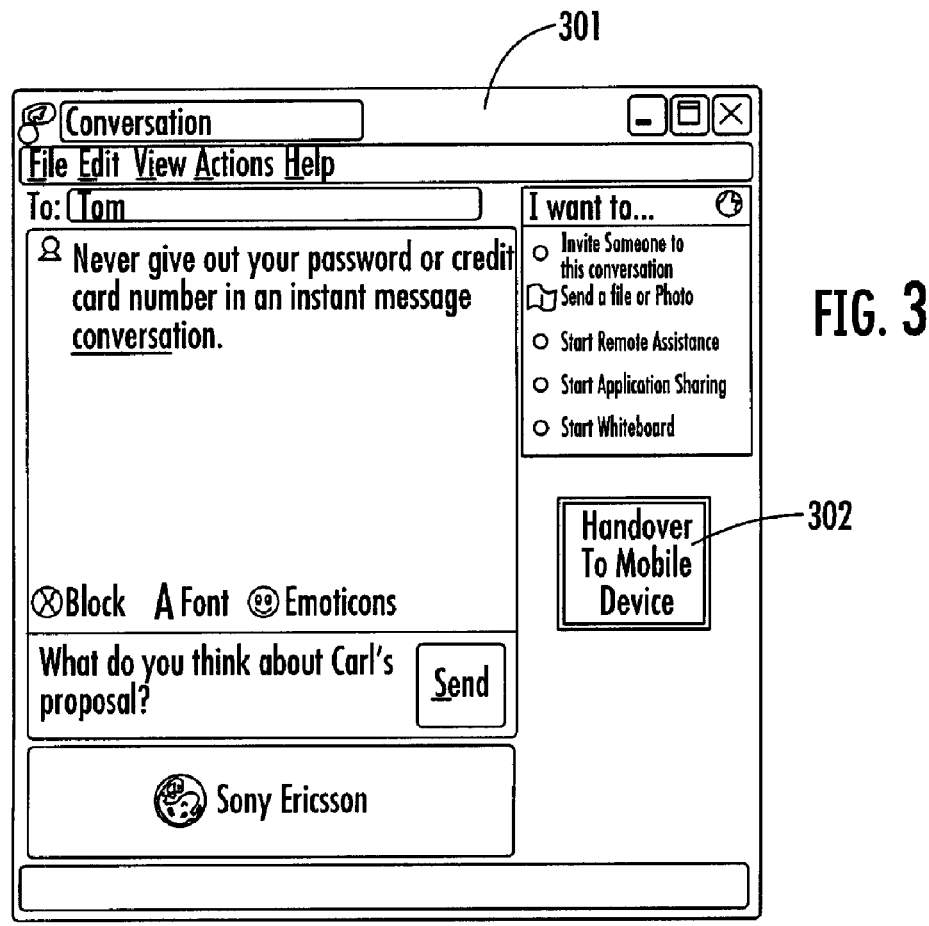
FIG. 3 is an example screen shot showing an active Instant Messaging session incorporating the method and apparatus of the invention.

For manual initiation the terminal session would include a screen as exemplified by IM screen shot 301 shown in FIG. 3. The user depresses button 302 to launch the transfer application module. Button 302 may consist of a touch screen button, a physical button, a cursor actuated button or other user interface technology.

Prior to the initiation of the session transfer procedure, the first communications device and the second communications device may perform an authentication protocol to ensure that the second communications device is authorized to receive the transfer of the session from the first communications device. One suitable authentication protocol is the Challenge Handshake Authentication Protocol (CHAP) that is commercially available. Other authentication protocols may also be used.

Figure 4:
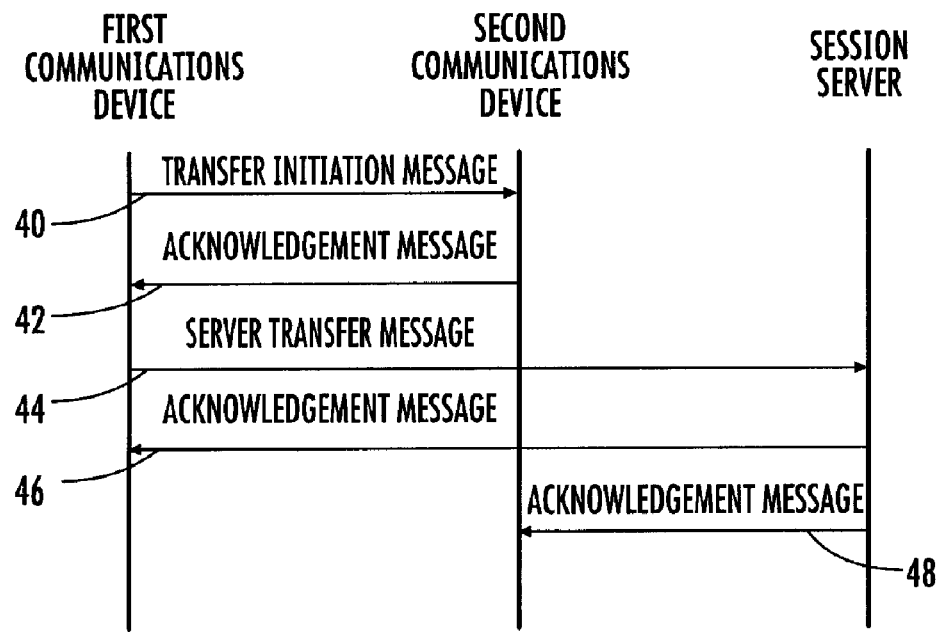
FIG. 4 is a message flow diagram illustrating the messaging for transferring a session.

Referring to FIGS. 1, 4 and 5, first communications device is in an active multimedia session (block 500). The session transfer application module 22 is launched (block 501) sending a transfer initiation message 40 from first communications device 2 to the second communications device 4 over link 16 (block 502). The information contained in the message 40 may vary depending on the type of session in progress. For example, for an IM session the transfer initiation message would include session identifier, username, password, IP address, and APN. A streaming audio session would need to additionally include information on the file format bit rate, sample rate and the like. While the information contained in the transfer initiation message may vary by session type it should be sufficient to identify to the second communications device the type of session being transferred and any parameters set for that session by the user or server handling the session. For sessions such as IM sessions the message may also include session history such as the recent messages sent and received at the first communications device that would normally be accessible by the user during an active IM session.

Upon receipt of the transfer initiation message 40 from the first communications device 2 the second communications device 4 launches the corresponding session transfer application module 24 locally (block 503). The second communications device 4 also sends an acknowledgement message 42 back to the first communications device 2 over link 16. The acknowledgement message informs the first communications device 2 that the second communications device 4 has received and understood the transfer initiation message and that it is ready to accept transfer of the session (block 504). A message may be displayed on the first communications device screen 28 to inform the user that the transfer is proceeding as intended and/or an error message may be presented informing the user that transfer of the session cannot be completed. If the transfer cannot be completed, the session will remain active on the first communications device 2 until terminated or transferred by the user (block 504).

The acknowledgement message 42 also includes identifying information for the second communications device 4. For a PC this would include the PC's IP address. For a mobile station this information may include a telephone number, SIM or other identifying information. Upon receipt of the second communications device identifying information, the first communications device 2 transmits a server transfer message 44 containing this information along with the session identification information over network 12 to the session server 14 (block 505). Upon receipt of this information, the session server 14 launches session transfer application module 20 (block 506) and reconfigures itself to send and receive content to and from the second communications device (block 507) such that the same session may be continued on the second communications device. The session is simultaneously terminated on the first communications device (block 507). Module 20 may also initiate the transmitting of acknowledgement message 46 from server 14 to the first communications device and an initiation message to the second communications device 4 to initiate the session.

If the second communications device is for example a PC the user can continue the transferred session while using other applications on the PC. Likewise, if the first communications device is a mobile phone the user can use the mobile phone for voice calls once the session is transferred from the phone to the second communications device.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

What is claimed is:

1. A method for transferring an active content transmitting session from a first communications device to a second communications device comprising:

engaging in an active session with the first communications device, wherein the first communications device comprises a mobile wireless device;

providing a computer-executable program module configured, by a user, to run on the first communications device;

identifying, by the computer-executable program module and without further input from the user, a second communications device in proximity to the first communications device, the second communications device having a short-range protocol communication activated;

sending, by the computer-executable program module, in response to identifying the second communications device in proximity to the first communications device and without further input from the user, a session transfer initiation message from the first communications device directly to the second communications device using the short-range protocol;

initiating a session transfer application in the second communications device responsive to receiving the session transfer initiation message sent from the first communications device directly to the second communications device using the short-range protocol;

transferring at least a portion of the active session to the second communications device directly between the first communications device and the second communications device over the short-range protocol connection; and terminating the session on the first communications device.

2. The method of claim 1 wherein the message includes an IP address.

3. The method of claim 1 further comprising receiving a second message from the second communications device identifying another communications device.

4. The method of claim 1 wherein content of the message is provided by the second communications device.

5. The method of claim 1, wherein an IP address of the communication devices is not acquired prior to the transferring the active session to the second communications device.

6. An apparatus for transferring an active content transmitting session from a first communications device to a second communications device comprising:

a processor for engaging in an active session with the first communications device, wherein the first communications device is a mobile wireless device configured, by a user, to run a computer-executable program module, the computer-executable program module configured to identify, without further input from the user, a second communications device in proximity to the first communications device, the second communications device having a short-range protocol communication activated;

the processor configured to receive a message sent without further input from the user, from the first communications device, the message identifying a second communications device, the message containing information identifying the second communications device, the information received by the first communications device from the second communications device over a short-range communications protocol;

a session transfer application module configured for, in response to the processor receiving the message containing information identifying the second communications device, directly transferring at least a portion of the active session from the first communication device to the second communications device over the short-range protocol communication; and terminating the session on the first communications device.

7. The apparatus of claim 6 wherein the message includes an IP address.

8. The apparatus of claim 6 wherein the message includes a telephone number.

9. A method of operating a communications device comprising:
engaging in an active session in a first communications device, wherein the first communications device is a mobile wireless device;
providing a computer-executable program module configured, by a user, to run on the first communications device;
identifying, by the computer-executable program module and without further input from the user, a second communications device in close proximity to the first communications device and with a short-range protocol communication activated;
initiating a session transfer application in the first communications device;
sending, by the computer-executable program module, in response to identifying the second communications device in proximity to the first communications device and without further input from the user, a session transfer initiation message from the first communications device directly to the second communications device using the short-range protocol;
receiving a message, at the first communications device, from the second communications device including an identification of the second communications device; and
sending a message from the first communication device to a session server, the message comprising the identification.

10. The method of claim 9 further including terminating the session on the first communications device.

11. A method of transferring a session from a first communications device to a second communications device comprising:
engaging in an active session on a first communications device with a session server, wherein the first communications device is a mobile wireless device;
identifying a second communications device in close proximity to the first communications device and with a short-range protocol communication activated;
initiating a session transfer application in the first communications device;
providing a computer-executable program module;
sending, by the computer-executable program module, in response to identifying the second communications device in proximity to the first communications device, a session transfer initiation message from the first communications device directly to the second communications device using the short-range protocol;
initiating a session transfer application in the second communications device responsive to receiving the session transfer initiation message by the second communications device;
receiving a message at the first communications device from the second communications device including an identification of the second communications device;
sending a message from the first communications device to the session server including the identification;
transferring the session at the server from the first communications device to the second communications device;
terminating the session on the first communications device; and
receiving, at a third communications device, a second message from the second communications device identifying the third communications device so as to transfer the active session from the second communications device to the third communications device.

12. The method of claim 11 wherein the message includes a telephone number.

13. A system capable of transferring a session from a first communications device to a second communications device comprising:
computer-executable program modules configured to:
identify a second communications device in close proximity to the communications device and with a short-range protocol communication activated;
initiate a session transfer application in the communications device using the short-range protocol;
send, in response to identifying the second communications device in proximity to the first communications device, a session transfer initiation message from the first communications device directly to the second communications device using the short-range protocol;
initiate a session transfer application in the second communications device responsive to receiving the session transfer initiation message by the second communications device;
receive a message at the communications device from the second communications device including an identification of the second communications device;
send a message from the communications device to the session server including the identification to initiate the server transferring the session from the communications device to the second communications device; and
receive a second message from the second communications device identifying a third communications device so as to transfer the active session from the second communications device to the third communications device.

14. The communications device of claim 13, wherein the message includes a telephone number.

* * * * *